No. 695,412. Patented Mar. 11, 1902.
C. F. MOORE.
TOBACCO TRUCK.
(Application filed June 29, 1901.)
(No Model.)
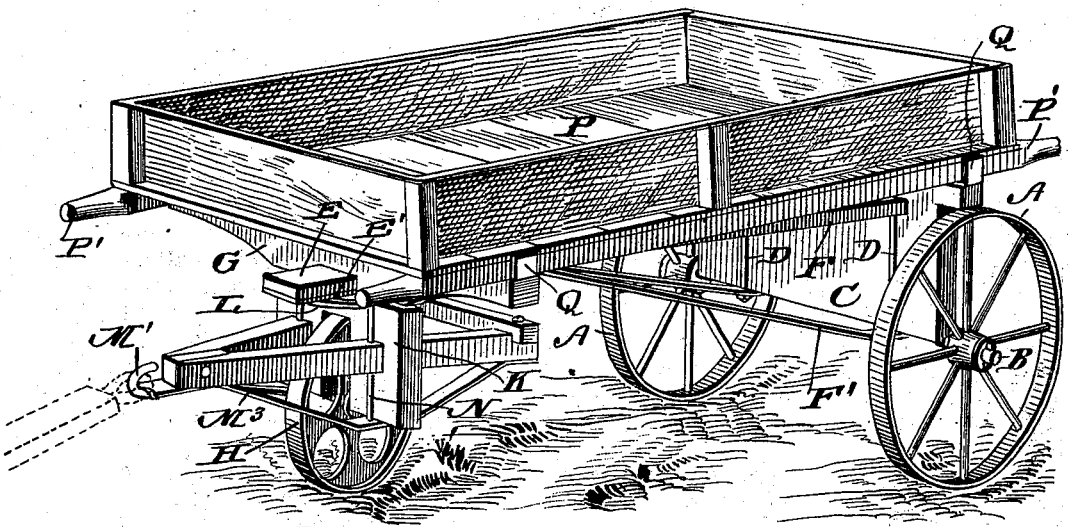
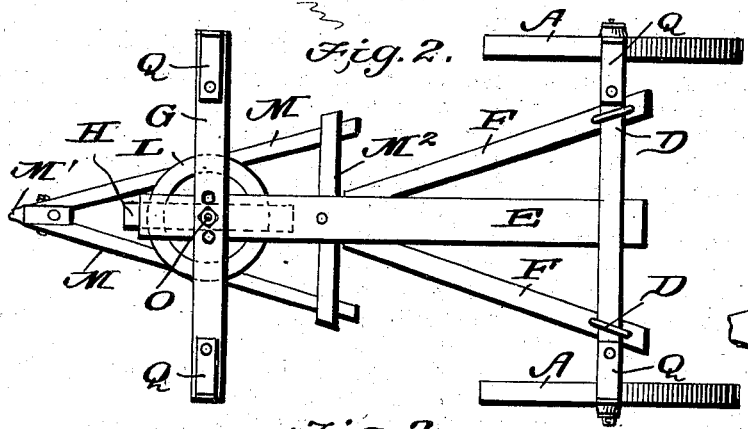
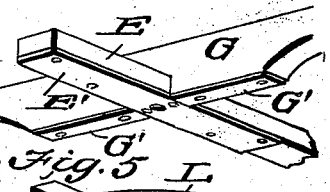
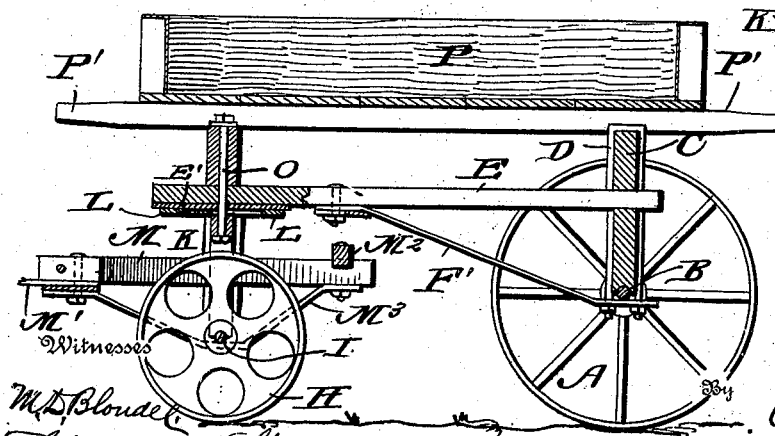
Witnesses
M. D. Blondel
Clarence Shaw
Inventor
C. F. Moore.
Attorneys
THE NORRIS PETERS CO., PHOTO-LITHO., WASHINGTON, D. C.

UNITED STATES PATENT OFFICE.

CHARLIE F. MOORE, OF ORMONDSVILLE, NORTH CAROLINA.

TOBACCO-TRUCK.

SPECIFICATION forming part of Letters Patent No. 695,412, dated March 11, 1902.

Application filed June 29, 1901. Serial No. 66,592. (No model.)

*To all whom it may concern:*

Be it known that I, CHARLIE F. MOORE, a citizen of the United States, residing at Ormondsville, in the county of Greene and State of North Carolina, have invented a new and useful Tobacco-Truck, of which the following is a specification.

This invention is an improved construction of truck particularly adapted for transporting leaf-tobacco from the field to the warehouse or barn.

The object of the invention is to provide an exceedingly light and durable construction of truck from which the body can be quickly and easily lifted for the purpose of dumping the same.

With these objects in view the invention consists in the peculiar construction of the various parts and in their novel combination or arrangement, all of which will be fully described hereinafter and pointed out in the claims.

In the drawings forming part of this specification, Figure 1 is a perspective view of a truck constructed in accordance with my invention. Fig. 2 is a top plan view of the running-gear. Fig. 3 is a vertical sectional view of the truck. Fig. 4 is a detail perspective view of the front bolster and forward end of reach. Fig. 5 is a detail perspective view of the fifth-wheel and supporting-block. Fig. 6 is a detail perspective view of the bracket arranged upon the end of the bolster for holding the body in proper position.

In constructing a truck in accordance with my invention I employ a pair of rear wheels A, mounted upon the rear axle B, said axle having a bolster C secured thereto by clips D. This bolster C is of considerably more than the ordinary height of rear bolster, and the reach E and rear hounds F pass through the said bolster about midway its height, and the clips D, which connect the bolster to the axle, also serve to secure the rear ends of the hounds F. Brace-rods F', attached to the under side of the reach, extend also to the under side of the axle, and the ends of the clips pass through the ends of said brace-rods, as most clearly shown in Fig. 3. The forward end of the rod E is securely fastened to the front bolster G, wear-plates E' and G', respectively, being secured to the bottom of the rod and bolster. Only one front wheel H is employed, and this wheel is considerably smaller in diameter than the rear wheels, said front wheel being mounted upon an axle I, which is securely fastened to a block K, carrying the fifth-wheel L at its upper end. The block K is slotted vertically, as shown at K', to receive the wheel H, and the front hounds M pass through the said block about midway its height upon opposite sides of the vertical slot K', said hounds being united at their forward ends and provided with a clevis M', while at their rear ends they are connected by means of a cross-piece M². Brace-rods M³ extend beneath the hounds and block, said rods being connected by the bolts N, which serve to secure the fifth-wheel, the hounds, and the brace-rods. The king-bolt O passes through the front bolster and front end of the reach and through the center of the rest-block K, the lower end of said bolt being located at the upper end of the slot or opening K'.

P indicates the body of the truck, which is made as light as possible, and the side beams are extended beyond the front and rear ends of the body and shaped into handles P', so that the body can be quickly and easily lifted off the running-gear whenever desired. The body rests upon the rear and front bolsters, and bracket-arms Q are fastened upon the said bolster adjacent to their ends in order to hold the body in place upon the bolster and prevent any lateral movement. Any suitable draft appliance may be attached to the clevis M' for the purpose of moving the truck.

It will thus be seen that I provide an exceedingly cheap and simple construction of truck particularly adapted for handling leaf-tobacco and one which will be exceedingly strong and durable.

Having thus fully described my invention, what I claim as new, and desire to secure by Letters Patent, is—

A tobacco-truck comprising a body removably supported upon a running-gear, said running-gear comprising a rear and front bolster having supporting-brackets at each end, the connecting pole or reach, the rest-block slotted vertically and adapted to receive the front wheel, a fifth-wheel arranged upon the upper end of said rest-block, the forward end of the pole or reach and the bolster being adapted to turn upon the said fifth-wheel, a king-bolt passing through the said bolster, reach and upper portion of the rest-block, the front and rear hounds and the front and rear brace-rods all arranged and adapted to operate substantially as shown and described.

CHARLIE F. MOORE.

Witnesses:
H. F. KEEL,
W. E. BELCHER.